Feb. 3, 1931. E. J. SWEETLAND 1,791,046
FILTER AND MEANS FOR SUPPORTING SAME
Filed July 18, 1924 5 Sheets-Sheet 1
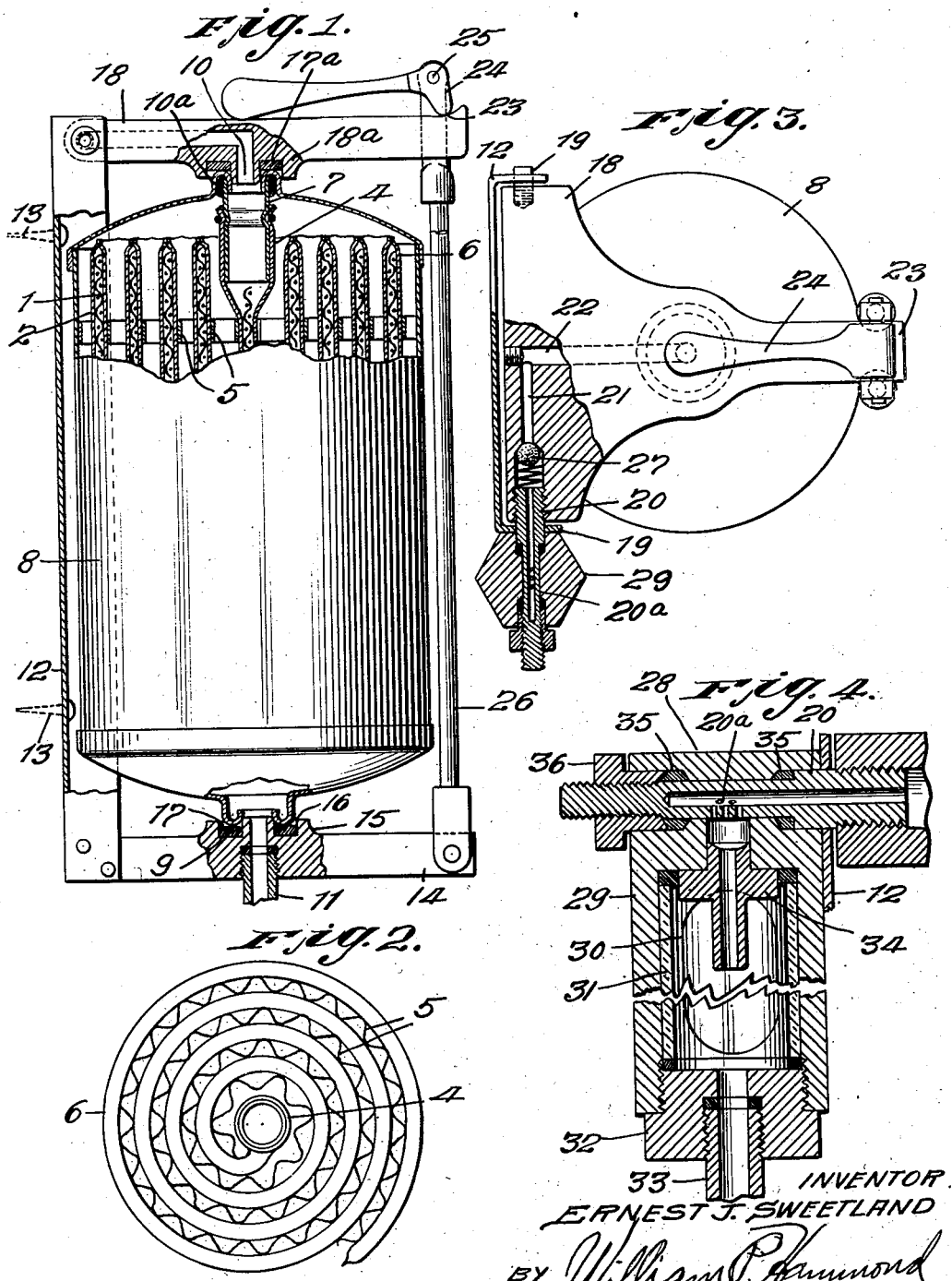
INVENTOR.
ERNEST J. SWEETLAND
BY William P. Hammond
ATTORNEY

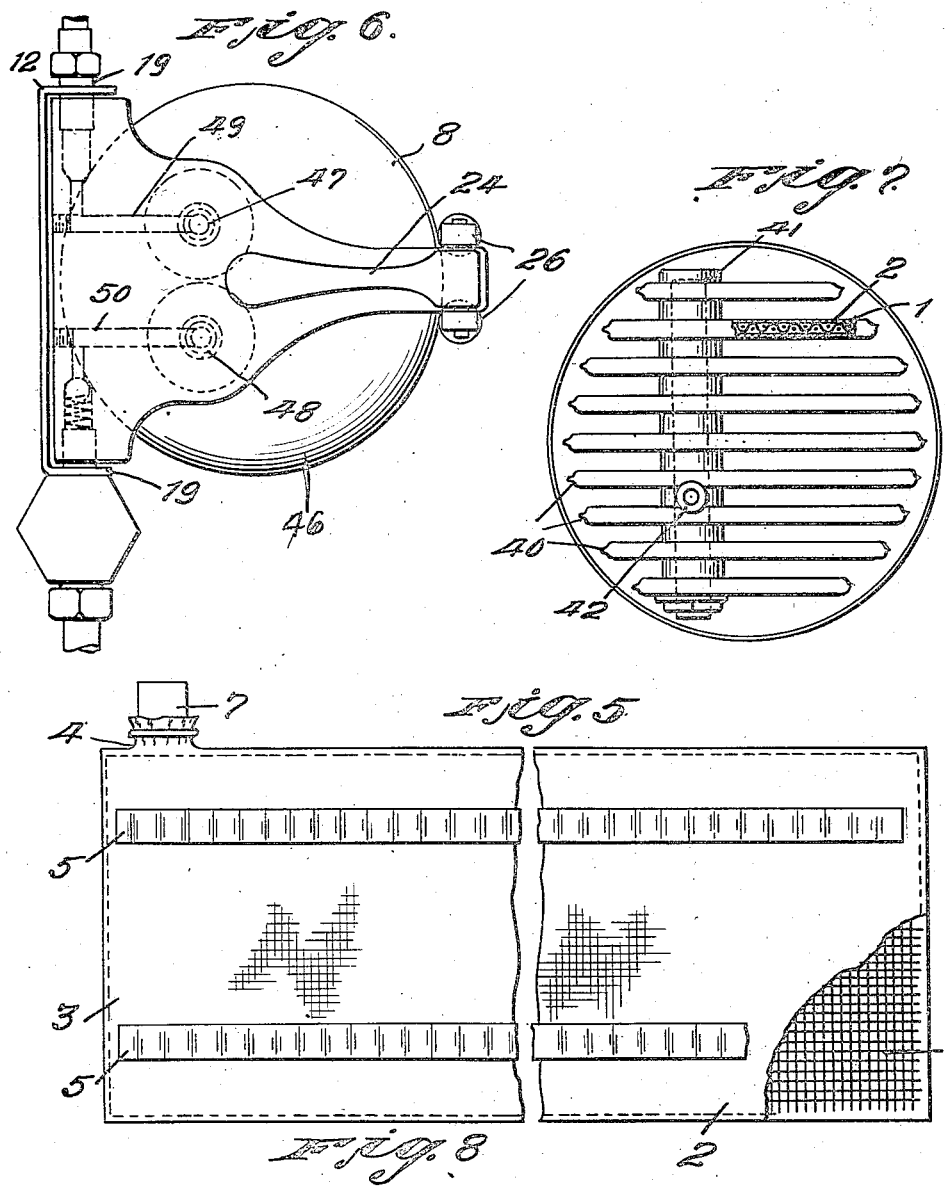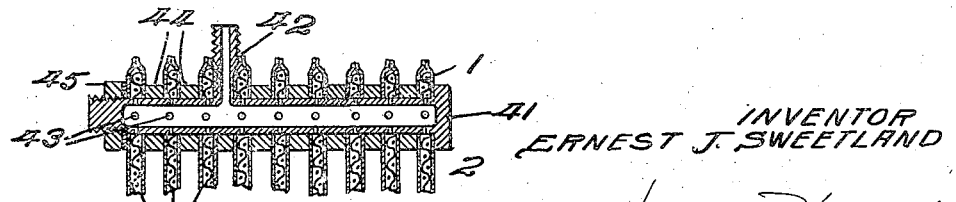

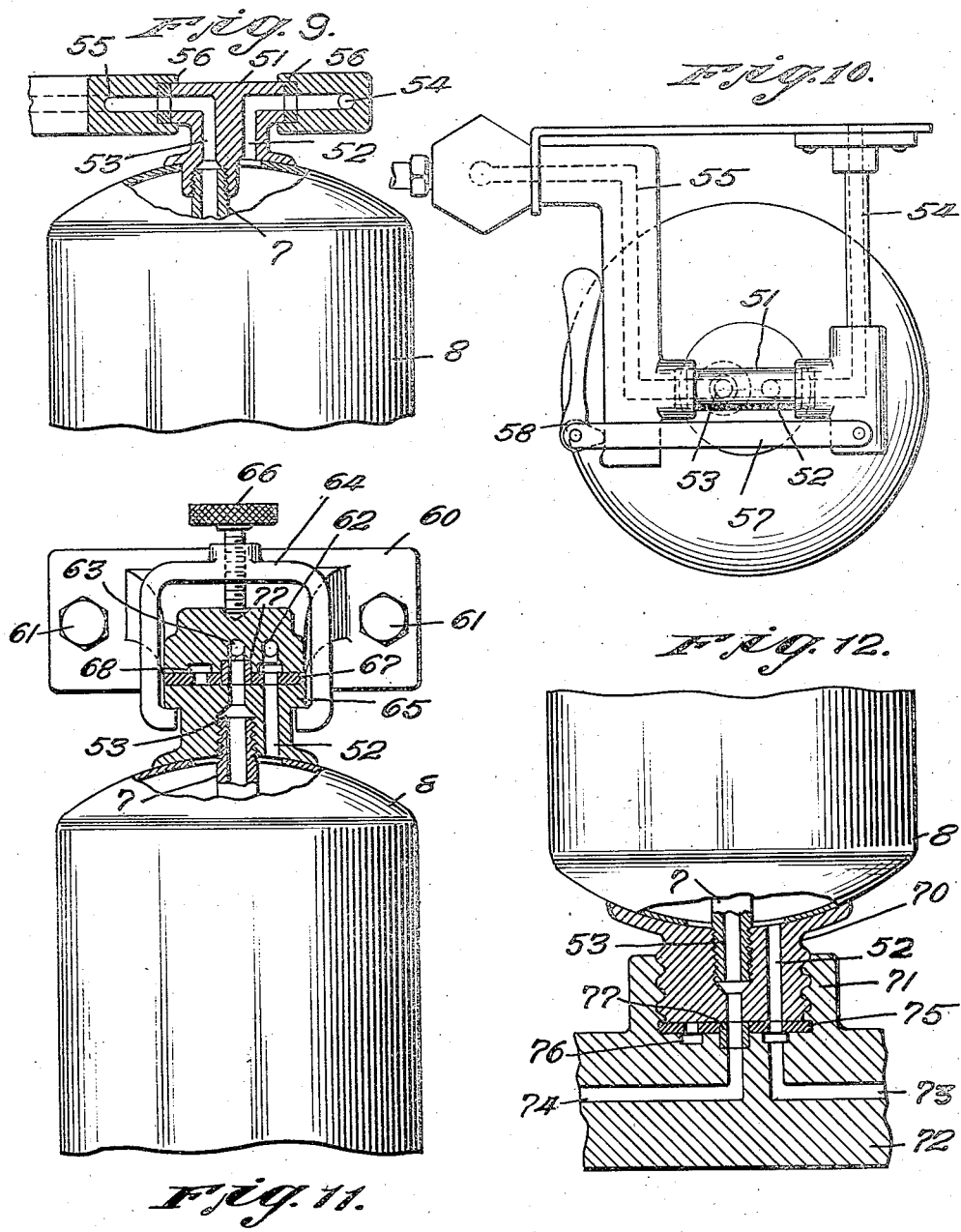

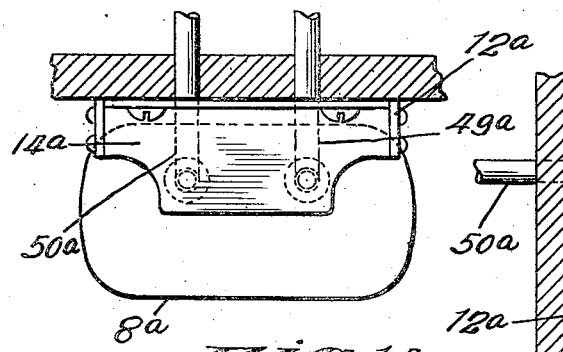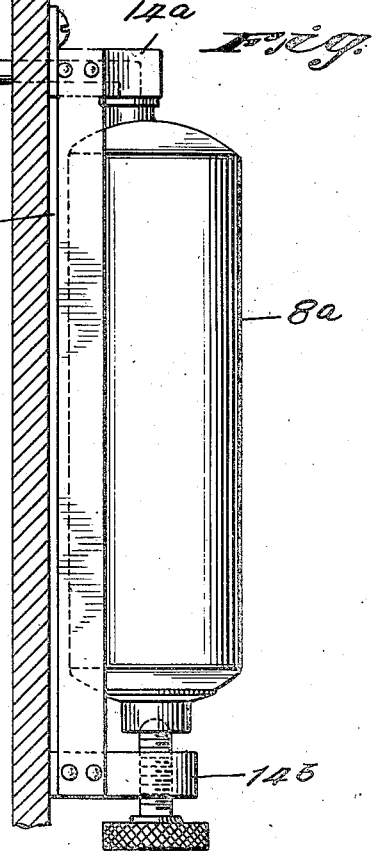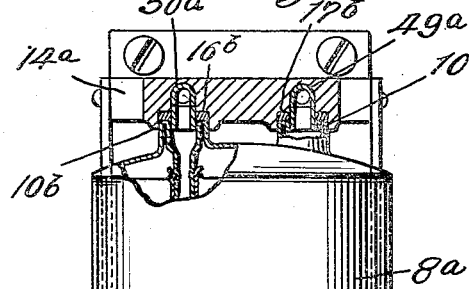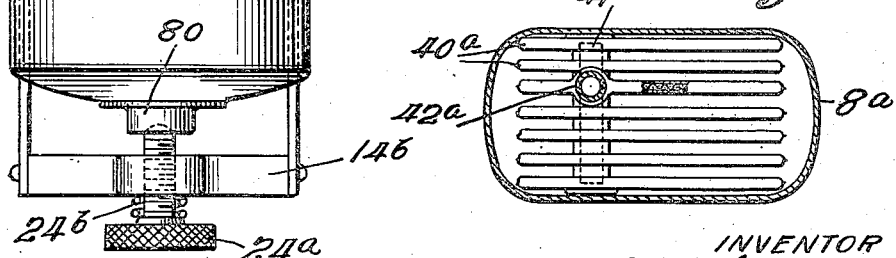

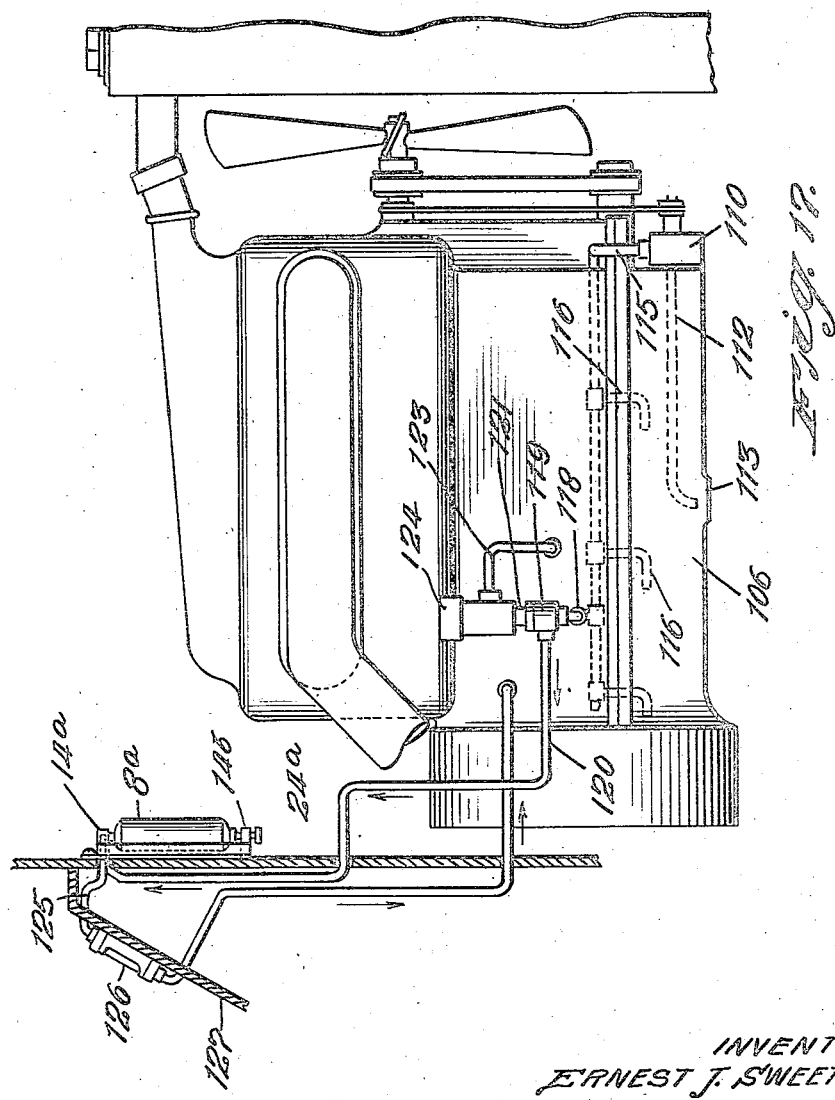

Patented Feb. 3, 1931

1,791,046

UNITED STATES PATENT OFFICE

ERNEST J. SWEETLAND, OF HAZLETON, PENNSYLVANIA

FILTER AND MEANS FOR SUPPORTING SAME

Application filed July 18, 1924. Serial No. 726,691.

This invention relates to an improvement in filters for use in the lubricating system of internal combustion engines or other machines and also an improvement in the means for connecting the filter in the lubricating system of an internal combustion engine whereby the same may be quickly disconnected and removed therefrom and another filter inserted in the system.

The invention is in part a continuation of my copending application, Serial No. 620,087, filed February 19, 1923, which discloses the use of a sealed discardable filter unit, having means therein for separating all solid particles from the oil, and means for easily and quickly connecting and disconnecting these sealed casings into the lubricating system, the casings being unopenable, by the means normally available, without ruining the filter.

It is one of the objects of this invention to provide an efficient sealed filter for the purpose described which can be easily and economically produced and hence can be profitably removed from the system when it becomes clogged with impurities extracted from the oil and replaced with a new filter.

Another object of the invention is to provide an improved means for supporting a filter of this type and connecting it with the lubricating system of an internal combustion engine whereby it can be easily and quickly disconnected and a new filter installed in its place.

Another object of the invention is to provide an improvement in the manufacture of filters which will facilitate and cheapen the production of the same.

Incidental to these main objects, various minor objects and advantages in the present invention will appear as the description thereof proceeds.

Referring now to the drawings which illustrate various possible forms of embodiment of my inventions.

Figure 1 is a side view partially in section of one form of my invention.

Figure 2 is a plan view of the filtering element therefor.

Figure 3 is a plan view, partially in section of the mounting bracket.

Figure 4 is a sectional view of the sight gage.

Figure 5 is an elevation of the filter element illustrating one stage in the manufacture thereof.

Figure 6 is a plan view of a modified form of mounting bracket.

Figure 7 is a plan view of a modified form of filter for use with the bracket of Figure 6.

Figure 8 is a sectional view of the outlet portion of the filter shown in Figure 7.

Figure 9 is a sectional view of another way of detachably connecting the filter in the lubricating system.

Figure 10 is a top plan view thereof.

Figure 11 shows a further modified form of filter and connecting means.

Figure 12 shows still another form of connection.

Figures 13, 14, 15 and 16 show a further modified form of filter.

Figure 17 is a side view showing how the filter may be connected with the lubricating system of an internal combustion engine.

In the form of embodiment of the invention shown in Figures 1 to 5, the filter is composed of a central drainage member 1 of screen wire, reticulated metal or any other suitable material which spaces the walls of the filter fabric 2 to permit drainage of the filtered oil therebetween. As illustrated in Figure 5, this filter is formed by enclosing a drainage member 1 of the shape shown in a rectangular envelope or bag 3 of filter fabric, a suitable outlet from the bag is provided at 4 and strips 5 of corrugated metal, paper or the like are secured to one side of the bag 3. The bag is then rolled into the circular or spiral element 6 with the corrugated strips 5 spacing the layers thereof.

During these operations an outlet nozzle 7 is secured in the outlet 4. The spiral element 6 is now inserted in a cylindrical casing 8 provided with an inlet 9 and an outlet 10 with which the nozzle 7 communicates and the nozzle 7 may be soldered in place as indicated at 10a.

In the operation of the filter as shown in

Figure 1, the lubricating oil from the engine, contaminated with carbon sediment, road-dust, particles of metal, etc., is forced under pressure from the crank case thru the pipe 11 into the inlet 9 of the filter casing 8 where the oil under pressure forces its way thru the walls 2 of the filtering material into the drainage area 1 and out thru the nozzle 7, leaving the solid impurities contained therein on the outer surface of the filter fabric.

In the course of time, the deposited carbon sediment, dust and other impurities accumulate upon the filter walls to such thickness as to greatly reduce or perhaps stop the flow of oil therethru. When this happens, it is desirable permanently to remove these impurities from the lubricating system by removing and discarding the filter element 6 and casing 8 and inserting a new filter and casing in lieu thereof.

To facilitate this renewal, the filter is mounted in a bracket 12 secured by the screws or the like 13 in any convenient place relative to the engine. The oil inlet pipe 11 from the engine is secured to the lower portion 14 of this bracket which is provided with a boss 15 having an annular groove 16 therein adapted to receive a gasket 17 which contacts with the inlet 9 of the casing to provide a fluid tight seal.

The upper portion of the bracket 12 has pivoted therein a channeled member 18 which is adapted to turn from horizontal to vertical position about the pivots 19. A hollow trunnion 20 extends thru one of the pivots 19 and communicates with the passage 21 in the member 18 and a communicating passage 22 at right angles to the passage 21 communicates with the outlet opening 10 of the filter casing 8.

The front portion of the member 18 extends forward beyond the edge of the casing 8 and is provided with a cam surface 23, adapted to cooperate with the cam lever 24 which is pivoted at 25 between the rods 26 which extend upward from the member 14. The boss 18a in the member 18 is grooved to receive a gasket 17a which makes a fluid tight seal with the top of the casing when the member 18 is clamped in place.

A spring pressed fiber ball 27 is located in the passage 21. This creates a slight resistance to the outflow of oil so that if a filter cloth becomes torn or the resistance of the filter otherwise reduced, the oil stream will not rush too freely thru the filter and prevent delivery of oil to the engine bearings in cases where the filter is connected to a branch line of the oil pump which delivers oil to the bearings.

The trunnion 20 extends thru the top 28 of a sight glass housing 29 which is provided with windows 30 protected by a section of glass tubing 31 retained in the housing 29 by the plug 32 to which is attached the return pipe 33 to the oil sump or to any desired part of the circulation.

A nozzle 34 in the sight glass conducts the oil from the openings 20a in the trunnion 20 to the center of the sight glass housing where it drops into the pipe 33. Suitable packing 35 is provided between the trunnion 20 and the sight glass housing and a packing nut 36 serves to keep an oil tight seal between these members.

During the operation of the filter, the flow of the oil may be observed in the sight glass to determine the rate and efficiency of the filter, and when the rate drops due to clogging of the filter or the like, the cam lever 24 may be released, the member 18 raised about the pivots 19 and the rods 26 swung outward from their pivot on the lower member 14 to permit removal of the clogged filter and replacement of a new filter in the bracket.

As the inlet and outlet connections are part of the bracket, this change of the filter element can be made in a very short time, by actual test in less than 30 seconds, and the cam action between the surface 19 and cam 24 insures a fluid tight seal when the new filter is clamped in place.

In the embodiment of the invention illustrated in Figures 6, 7 and 8, the filter is composed of a plurality of horizontally spaced filter elements 40, each consisting of a drainage member 1 with filter walls 2, mounted on a drainage manifold 41 provided with a suitable outlet 42 for the filtered oil. Passages 43 thru the walls of the manifold 41 permit the flow of oil into the manifold while the spacing discs 44 compressed between the filter elements 40 by the nut 45 space the elements apart and prevent leakage of unfiltered oil into the manifold.

The casing 46 is provided with an inlet opening 47 and outlet 48 in the top thereof and the channeled member 18 is provided with passages 49 and 50 communicating respectively therewith. The casing is suitably supported from below by the bottom member 14. This casing may be removed and replaced in the bracket 12 by releasing the cam lever 24 as in Figure 1.

Figures 9 and 10 show a modified form of oil connection for the filter casing in which the casing is provided with a combined inlet and outlet manifold 51 containing passages 52 and 53 leading into and out of the casing 8.

The inlet from the engine is thru the pipe 54 and the outlet thru the pipe 55 and each of these pipes is provided with a socket 56 adapted to cooperate with the manifold 51 to form a fluid tight seat. A clamping device 57 is pivoted on the pipe 54 and carries a cam lever 58 cooperating with the cam surface on the outlet pipe 55 to clamp the inlet and outlet pipes to the manifold 51.

Figure 11 shows a further modification of the invention in which the filter casing is suspended from the bracket 60 secured by bolts 61 to any suitable portion of the automobile.

The bracket 60 is provided with inlet and outlet passages 62 and 63 respectively which communicate with the inlet 52 and outlet 53 to the filter casing. To insure a fluid tight seat between the bracket and the casing, a screw clamp 64 is suspended from the bracket and is adapted to extend under the flange 65 on the filter casing so that when the screw 66 is turned down the casing 8 is drawn up tight against the gasket 67.

To insure communication between the inlet for the casing and the inlet passage 62, the bracket 60 is provided with an annular groove 68 on the radius of the distance between the outlet and inlet for the casing 8 so that the inlet of the filter will communicate with the inlet passage 62 by way of the groove 68 regardless of any angular or rotational movement of the casing inlet around the casing outlet.

Figure 12 shows a modification very similar to Figure 11, in which the filter casing is provided with a screw neck 70 adapted to screw into a threaded socket 71 in the supporting bracket 72. Inlet and outlet passages 73 and 74 in the bracket communicate with the inlet and outlet passages 52 and 53 to the filter and a gasket 75 provides for a fluid tight seal between the filter and the casing. The annular groove 76 insures communication between the inlet passages in any position to which the filter casing is turned. To hold the two parts of the gaskets 67 and 75 in place the outlet passages 74 and 63 are provided with a central projecting nozzle 77 around which the inner gasket member is inserted, while the outer gasket member is clamped in place and properly centred by the abutting faces of the bracket and the filter manifold.

Figures 13 to 16 show a form of filter in which the inlet and outlet openings are clamped against corresponding passages in a stationary bracket by means of a clamping member acting upon the end of the filter opposite the intlet and outlet openings. In this embodiment of the invention the bracket 12a is provided with rigid upper and lower projections 14a and 14b between which the filter is supported. The upper projection 14a is provided with an inlet passage 49a and an outlet passage 50a communicating with the corresponding openings to the filter, and the lower projection 14b is provided with a thumb screw 24a which fits into a thimble 80 on the bottom of the filter to force the flanges or rims 10b around the filter opening into fluid tight engagement with the gaskets 17b of the grooves 16b in the upper projection. A coil spring 24b assists in holding the screw 24a in any desired position of adjustment.

In this embodiment the filter casing 8a is of an oval shape and the filter elements 40a are arranged to run the long way of the oval so that the filter elements can be made of larger area and of uniform size thereby increasing the filtering capacity and reducing the cost of the assembly. The drainage manifold 41a running through all the elements is provided with an outlet 42a as in the construction of Figure 7.

Figure 17 shows how the preferred way of connecting the filter into the lubricating system of an internal combustion engine, in which, the lubricating oil is drawn from the crank case 106 by the oil pump 110 and supplied to the bearings and to the filtering devices. The oil pump 110 is shown as connected on its intake side to the pipe 112, the end of which extends preferably to the lowest point in the crank case, for example, into the depression 113; and on its outlet side said pump is connected to the pipe 115, from which branch pipes such as 116 lead to the various bearings to be lubricated. Branching from the pipe 115 is a pipe 118 provided with a T fitting 119 to which pipes 120 and 121 are connected. The pipe 121 is connected to a pipe 123 leading back to the crank case 106, through the safety valve 124 which may be of any simple form. Normally, the valve 124 does not permit oil to pass back to the crank case through it, but this valve will open if the pressure against which the oil pump 110 is working is abnormally increased on account of excessive viscosity of the oil or due to high speed of the engine.

The pipe 120 leads to the inlet 49a in the bracket 14a and the pipe 125 connects with the filtrate outlet passage 50a and leads through the sight glass 126 on the dash 127 back to the crank case.

It is to be especially noted that in each modification shown the filter is of a type which may be easily and cheaply produced and the casing 8 is of an ordinary cylindrical can construction with the inlet and outlet openings 9 and 10 as in Figures 1 and 14 formed by stamping or spinning and in Figures 9 to 12 formed by securing the inlet and outlet manifolds to the nozzle 7 and to plain openings in the walls of the container.

It will be understood that the invention is not limited to details of the structures described, and that many modifications and changes can be made therein without departing from the spirit of the invention or the scope of the appended claims.

I claim:

1. In a fluid pressure system, means to removably insert in said system a replaceable filter having inlet and outlet openings in an end wall thereof, including a pair of spaced supporting members, adjustable means associated with one of said members to detachably clamp a filter element between the members, and a pair of passageways associated with the other of said members, and forming a part of said fluid system and adapted for communication respectively with the inlet and outlet openings in the end wall of the filter.

2. In a fluid pressure system, means to removably insert in said system a replaceable filter unit, having inlet and outlet openings in an end wall thereof, including a pair of spaced supporting members, a screw stud having threaded engagement within an aperture in one of said supporting members for adjustment toward and from the other member and adapted by its adjustment to engage with one wall of the filter unit and clamp the wall having the inlet and outlet openings against the other of said members, and a pair of passages formed in the other of said members and adapted for communication with the inlet and outlet openings respectively in the adjacent wall of the filter supported between said members.

3. Means to removably insert a replaceable filter unit, having its inlet and outlet in one end wall thereof, in a fluid pressure system, including a pair of spaced supporting members, between which the filter unit is to be secured, a set screw carried by one of said members and adjustable toward and from the other member, to clamp a filter unit with its inlet and outlet end wall in contact with the other member, and a pair of passageways formed in the other member for communication with the inlet and outlet respectively of the filter unit.

4. The structure set forth in claim 3 and a sealing gasket adapted for interposition between the supporting member and inlet and outlet end of the filter unit and a pressure distributing element interposed between the opposite end of the filter unit and said set screw.

5. In apparatus of the character described, an oil filter comprising a sealed casing, a spiral filter element therein, the casing having inlet and outlet passages, means to connect the filter element to the outlet passage, a bracket for supporting the filter, the bracket having inlet and outlet passages through it from the lubricating system of an engine to the filter and means for clamping said filter in said bracket in fluid tight connection with said last-named inlet and outlet passages.

6. In apparatus of the class described, means to connect an oil filter into the lubricating system of an engine, a bracket for supporting the filter, said bracket having inlet and outlet passages through it from the lubricating system to the filter, a spiral filter element in said filter, one of said passages being centrally located to communicate with the center of the spiral element and clamp means for clamping said filter in said bracket in fluid tight connection with said inlet and outlet passages.

7. In apparatus of the class described, means to connect an oil filter into the lubricating system of an internal combustion engine, a bracket for supporting said filter in detachable connection with said system, said bracket having inlet and outlet passages through it from the lubricating system, the filter having inlet and outlet openings, and cam means for clamping said filter in said bracket with the inlet and outlet openings thereof in fluid tight engagement with said passages.

8. In apparatus of the character described, means to connect an oil filter into the lubricating system of an internal combustion engine, comprising a bracket for detachably holding said filter in fluid tight communication with the inlet and outlet passages of said lubricating system, a filter element in connection with the outlet passage, a pair of bosses in said bracket, with gasket-packed grooves in same, the filter having openings with cooperating rims adapted to extend into said grooves, the passages of the lubricating system extending through said bosses and communicating with the openings, means to clamp the bracket upon said filter, and means to keep the portions of the filter element separated when in operation.

9. In apparatus of the class described, an oil filter, means to connect said oil filter into the lubricating system of an internal combustion engine comprising a bracket for supporting said filter in detachable connection with said system, the bracket having inlet and outlet passages leading to said filter through said bracket, a pivoted top member for said bracket, a rigid bottom member and means for clamping the filter between said top and bottom members in fluid tight engagement with said passages.

10. In apparatus of the character described, means to connect an oil filter into the lubricating system of an internal combustion engine, a bracket for supporting said filter in detachable connection with said system, the bracket having inlet and outlet passages leading to said filter through said bracket, a pivoted top member for said bracket, a rigid bottom member, connecting means pivoted on said bottom member and a clamp for detachably clamping said filter and said connecting member together for detachably holding the filter in fluid tight communication in said lubricating system.

11. In apparatus of the class described, means to connect an oil filter into the lubricating system of an engine comprising a bracket for supporting the filter, the bracket having inlet and outlet passages leading through said bracket from the lubricating system to the filter and means in one of said passages for retarding the flow of oil through the filter.

12. In apparatus of the class described, means to connect an oil filter to the lubricating system of an engine, a bracket for supporting the filter, the bracket having inlet and outlet passages leading through said bracket to the filter and means comprising a ball check valve in one of said passages for retarding the flow of oil through said filter.

13. In apparatus of the class described, means to connect an oil filter into the lubricating system of an internal combustion engine, a bracket for supporting said filter in detachable connection with said system, the bracket having inlet and outlet passages leading through said bracket from the lubricating system, a spirally wound filter element attached to said outlet passage, a corrugated metallic spacing strip spacing the convolutions of said element from each other, the filter having inlet and outlet openings, and means for clamping said filter on said bracket with the inlet and outlet openings thereof in fluid tight engagement with said passages.

14. In apparatus of the class described, means to connect an oil filter into the lubricating system of an engine comprising a bracket for supporting the filter, a spirally wound filter element in said filter, a centrally projecting drainage member therefor, the bracket having inlet and outlet passages leading through said bracket from the lubricating system to the filter, one of which is attached to said drainage member, means in one of said passages for retarding the flow of oil through the filter and means to separate said filter convolutions without hindering the oil flow.

15. In apparatus of the class described, means to connect an oil filter to the lubricating system of an engine, a bracket for supporting the filter, one part of which is pivoted, the bracket having inlet and outlet passages leading through said bracket to the filter, a spirally wound filter element, said element having a metallic corrugated spacing member, to space the spirals thereof without hindering oil flow under pressure, and means comprising a ball check valve in one of said passages for retarding the flow of oil through said filter.

16. In an apparatus of the class described, an oil filter, means to connect said oil filter into the lubricating system of an internal combustion engine comprising a bracket for supporting said filter in detachable connection with said system, the bracket having a pivoted top member and rigid bottom member, each of said members being provided with fluid passages acting as inlet and outlet passages for said filter, and quick detachable clamping means for clamping the filter between the top and bottom members in fluid tight engagement with said passages.

17. In apparatus of the class described, means to connect an oil filter into the lubricating system of an internal combustion engine, a bracket for supporting said filter in detachable connection with said system, said bracket having inlet and outlet passages through it from the lubricating system, the filter having inlet and outlet openings adjacent said passages, a thumb screw means for clamping said filter in said bracket with the inlet and outlet openings thereof in fluid tight engagement with said passages.

18. In apparatus of the class described, means to connect an oil filter in the lubricating system of an engine, a bracket for supporting the filter, said bracket having inlet and outlet passages through it from the lubricating system to the filter, the filter having a plurality of fluid passages on the bottom thereof and cooperating with the passages in said bracket, one of said passages being centrally located and communicating with the center of the filter, a spiral filter element in said filter, in fluid communication with said central passage, and means for securing said filter to said bracket in fluid tight connection with said inlet and outlet passages.

In testimony whereof I have affixed my signature to this specification.

ERNEST J. SWEETLAND.